W. C. HUEBNER.
ELECTROMAGNETIC CLUTCH AND BRAKE.
APPLICATION FILED JULY 6, 1916.

1,334,759.

Patented Mar. 23, 1920.
3 SHEETS—SHEET 3.

Inventor.
Wm. C. Huebner
By Wilhelm & Parker
Attorneys.

UNITED STATES PATENT OFFICE.

WILLIAM C. HUEBNER, OF BUFFALO, NEW YORK, ASSIGNOR TO HUEBNER-BLEISTEIN PATENTS COMPANY, OF BUFFALO, NEW YORK.

ELECTROMAGNETIC CLUTCH AND BRAKE.

1,334,759. Specification of Letters Patent. Patented Mar. 23, 1920.

Application filed July 6, 1916. Serial No. 107,786.

*To all whom it may concern:*

Be it known that I, WILLIAM C. HUEBNER, a citizen of the United States, residing at Buffalo, in the county of Erie and State of New York, have invented a new and useful Improvement in Electromagnetic Clutches and Brakes, of which the following is a specification.

This invention relates to electromagnetic clutches or brakes of the sort disclosed in Letters Patent 1,056,545, granted to William C. Huebner, assignor, March 18, 1913, which comprise two relatively rotatable members, one of which is provided with a multiplicity of magnetic faces separated by non-magnetic gaps or portions, and the other of which carries a multiplicity of armatures corresponding in number with the magnetic faces and adapted to coöperate therewith to prevent relative movement between said members. If both of the relatively movable members are rotatable and one is driven, the other member is caused to turn therewith and the device can thus be used as a clutch or coupling, whereas if one of the members is held stationary it acts to retard or prevent the rotation of the other member and thus acts as a brake.

One of the objects of this invention is to produce a practically frictionless electromagnetic clutch and brake of improved and simplified construction, suitable for power transmission in mills, for groups of machines and for individual drives on automatic machines, which insures a quick pick-up of the load from complete inertia without the shock inherent in the more common types of the magnetic and mechanical clutches, and enables a quick stopping or checking of the moving parts within proper space or limits without shock or strain thereon, and which gives practically instant control; which also provides a semi-flexible coupling that acts as a safety factor and protection as in the case of an abnormal strain or overload during the transmission of power, and enables the starting and stopping of the driven member to be effected quickly and easily by means of a push button or other readily operated switch, an important point for quick action in case of emergency; and also which gives more torque with a given amount of current than magnetic clutches of the sort where the armature is in contact at all times during operation with the magnet without breaking the magnetic circuit. Another object of the invention is to produce a clutch, brake or the like of improved construction which can be manufactured and assembled with the minimum labor and expense, which is strong and durable and in which the wear is reduced to the minimum.

Figure 1:
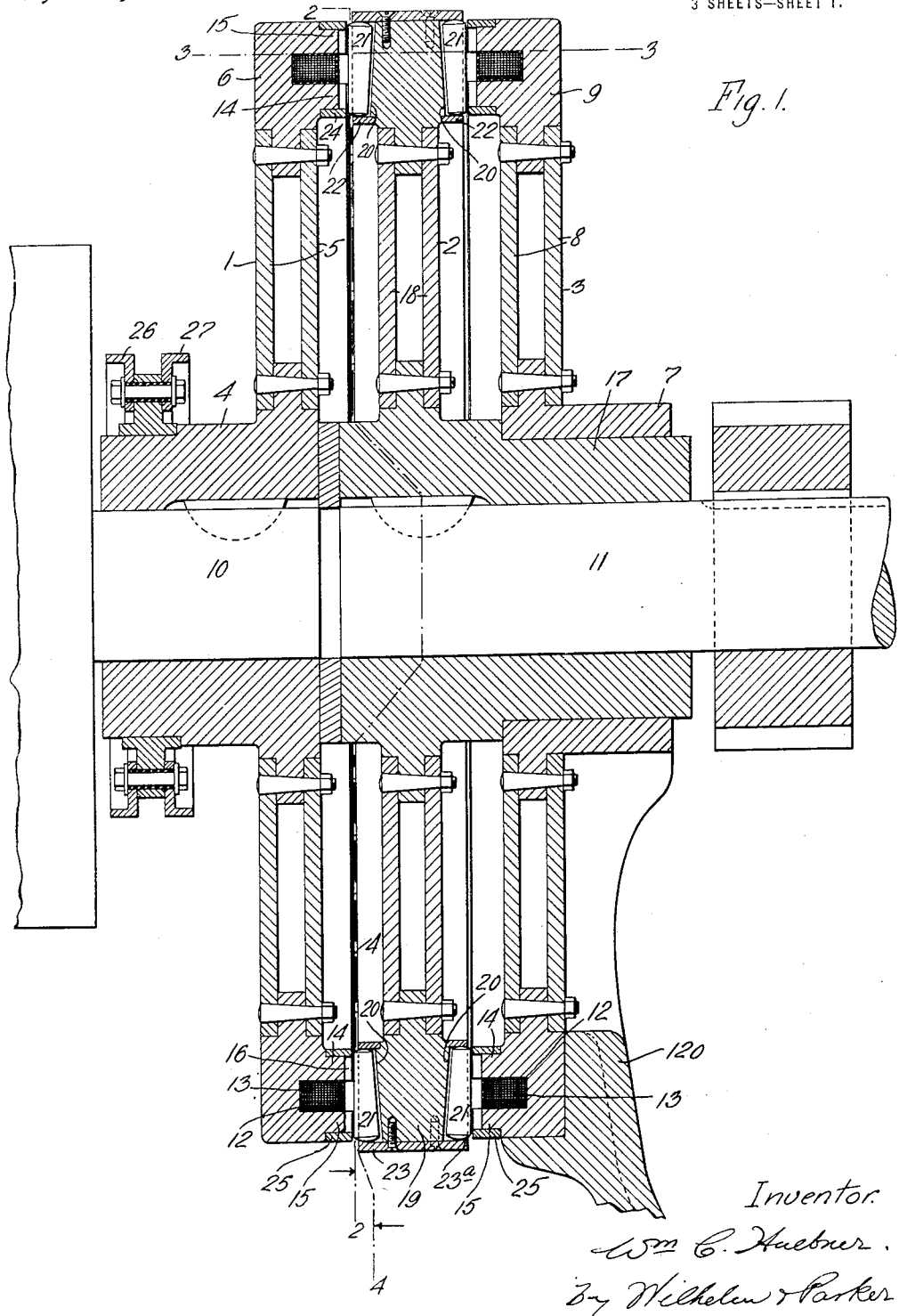
Figure 1 is a longitudinal sectional elevation of a combined electromagnetic clutch and brake embodying the invention.
Figure 2:
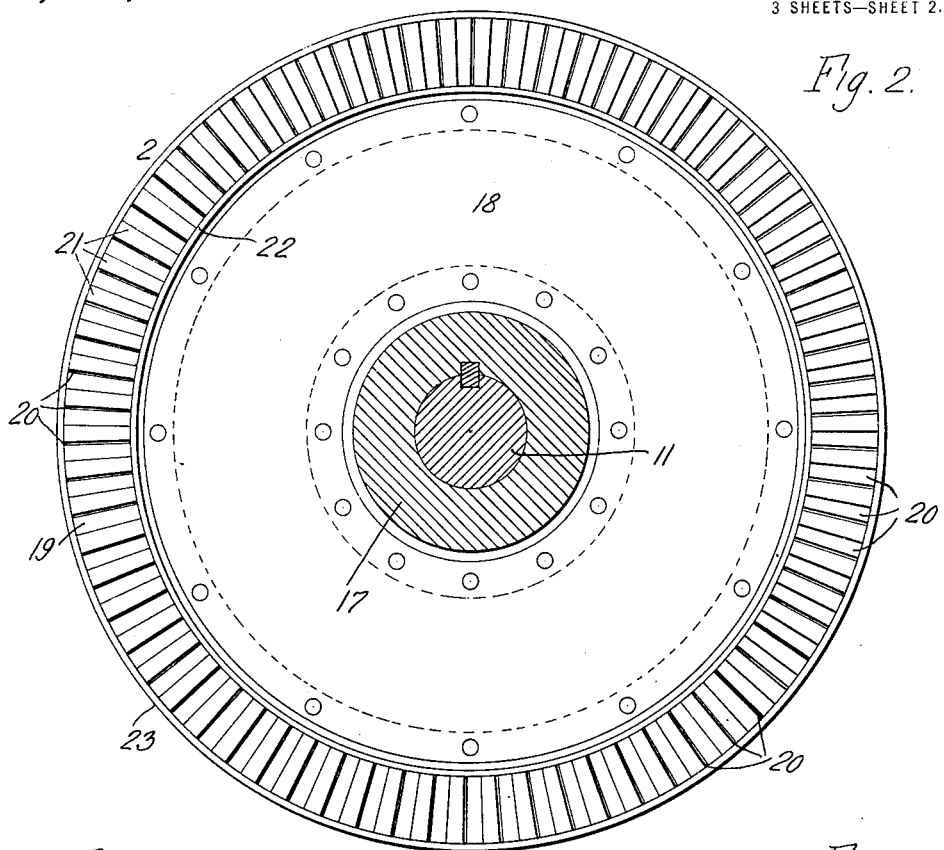
Fig. 2 is a transverse sectional elevation thereof on a reduced scale on line 2—2, Fig. 1.
Figure 3:
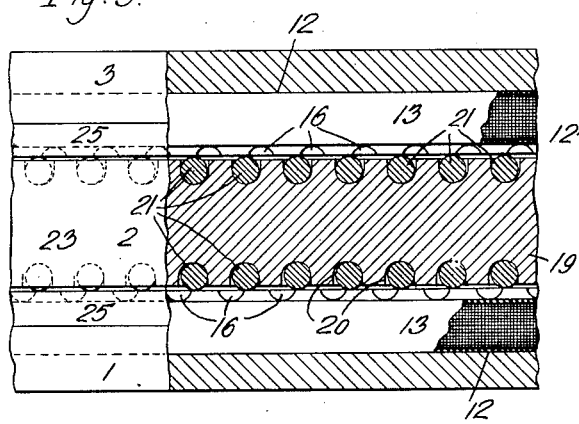
Fig. 3 is a fragmentary plan view thereof, partly in section on line 3—3, Fig. 1.
Figure 4:
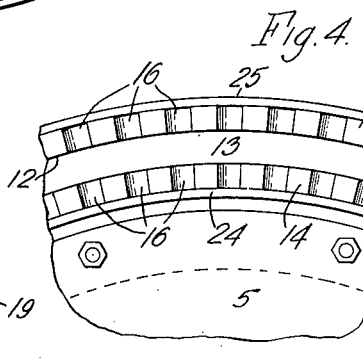
Fig. 4 is a fragmentary transverse sectional elevation on line 4—4, Fig. 1.

The combined clutch and brake in both of the constructions shown in the drawings comprises three members 1, 2 and 3 which are relatively movable. One of these members, for instance, the member 1, is a driving member and is adapted to be rotatably mounted and rotated in any suitable way, while the driven member 2 adjacent thereto is mounted to rotate and is adapted to be caused to turn with the driving member when one of these members is magnetized. The third member 3 is stationarily secured in any suitable way adjacent to the driven member 2 and acts by magnetic energy to retard or prevent the rotation of the driven member 2. The driving and brake members 1 and 3, in the device shown, are provided with the magnetic portions, and the driven member 2, between the same, carries the coöperating armatures. Thus by energizing or magnetizing the driving member 1, the driven member 2 is caused to turn therewith, and by deënergizing or de-magnetizing the driving member and energizing or magnetizing the brake member 3, the rotation of the driven member is retarded or stopped. The driving member 1 and the brake member 3 can be and preferably are alike except that they are oppositely arranged at opposite sides of the driven member and the former is rotatably mounted and adapted to be positively rotated, while the latter is adapted to be held from rotation. As shown, the driving member comprises a hub 4, two annular disks or plates 5 of brass or other non-magnetic metal, which are suitably secured rigidly at their inner edges to the hub, and a magnetic rim 6 which is suitably secured rigidly between the outer edges of the plates or disks 5. Similarly the stationary or brake member comprises a hub 7, annular plates or disks 8 of non-magnetic metal secured at their inner edges thereto, and a magnetic rim 9 which is rigidly secured between the outer edges of the plates or disks 8. The driving member is rotatably mounted and rotated, for instance, by having its hub secured on a drive shaft 10 to turn therewith, while the hub 7 of the brake member surrounds an alined shaft 11 concentrically therewith and is held stationary, as, for example, by a bracket 120 to which the brake member is bolted. The rims 6 and 9 of the driving and brake members are provided at their inner sides, or sides facing each other, with circumferential grooves 12 in which are arranged electric coils 13 which, when energized, magnetize the rims 6 and 9. The portions 14 and 15 of each rim located respectively inwardly and outwardly from the coil 13 are of opposite polarity and these inner and outer circumferential portions of the rim are divided by radial gaps or grooves 16 into a multiplicity of spaced magnetic faces, the alined faces within and outside of the coil being of opposite polarity. Thus each rim is composed of a multiplicity of separated or spaced radially arranged magnets having poles of opposite polarity within and outside of the electric coil.

The driven member 2, like the driving and brake members, preferably comprises a hub 17, parallel circular plates or disks 18 which are rigidly secured at their inner edges to the hub, and a rim 19 which is rigidly secured between the outer edges of the plates or disks 18. The driven member can be fixed to the shaft 11, which turns relatively to the driving shaft 10, or it can be mounted to turn relatively to the driving member in any other suitable way. The rim 19 of the driven member is located and adapted to turn between the magnetic rims 6 and 9 of the driving and brake members, and this rim 19 of the driven member is provided in the opposite sides thereof with radial grooves or pockets 20 in which are confined a multiplicity of radial armatures. The number of armatures on each side of the driven member corresponds to the number of spaced magnet portions of the driving or brake member adjacent thereto so that each armature is adapted to complete the magnetic circuit through the two poles of each magnet portion. The armatures 21 shown in Figs. 1-4, consist of round, tapered or frusto-conical pins of magnetic material and are retained in place in their pockets 20 by suitable non-magnetic retaining rings 22 secured to the rim 19 at the inner ends of the armatures and a retaining ring 23 secured to the outer periphery of the rim 19 at the outer ends of the armature. The armatures are arranged at an inclination in the pockets so that their outer faces which are nearest to the driving and brake members stand in vertical planes parallel with the planes of rotation of the magnetic faces of the driving and brake members. As the armatures are tapered and arranged at an inclination with their larger ends outermost, they tend to fall by gravity into the pockets 20 away from the magentic faces of the driving and brake members and are thus normally held out of contact with these members and are adapted to rotate freely with the driven member without frictional engagement with the driving and brake members. In order to assist the action of gravity for this purpose, the ends of the armatures are preferably made convex and engage concave inner faces 23ª on the retaining ring 23. Each of the driving and brake members is preferably provided at the inner side thereof with inner and outer rings 24 and 25 of brass or other suitable non-magnetic material which bridge or close the inner and outer ends of the gaps 16 in the magnetic rims, and are adapted to engage the ends of the armatures 21 and prevent them from moving into said gaps as they pass by the same. These rings preferably do not extend out quite flush with the inner faces of the rims 6 and 9 and therefore do not hold the armatures out of contact with the magnet faces, so that in the rotation of the driven member relative to the driving and brake members the armatures can slide over the magnet faces in contact therewith and move from one pair to the next pair of faces without appreciably entering the gaps 16 and striking the edges of the magnet faces and thereby causing objectionable noise and wear in the operation of the device.

Figure 5:
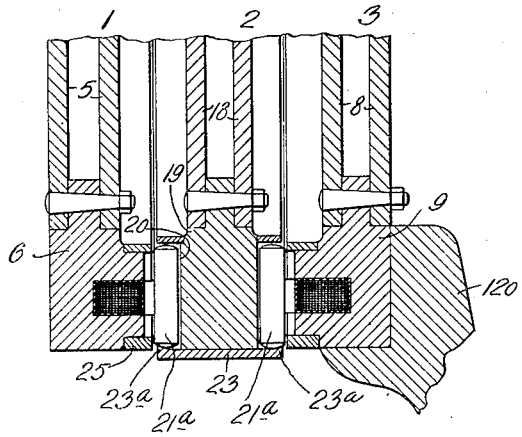
Fig. 5 is a fragmentary longitudinal sectional view similar to Fig. 1, showing a slightly modified construction.
Figure 6:
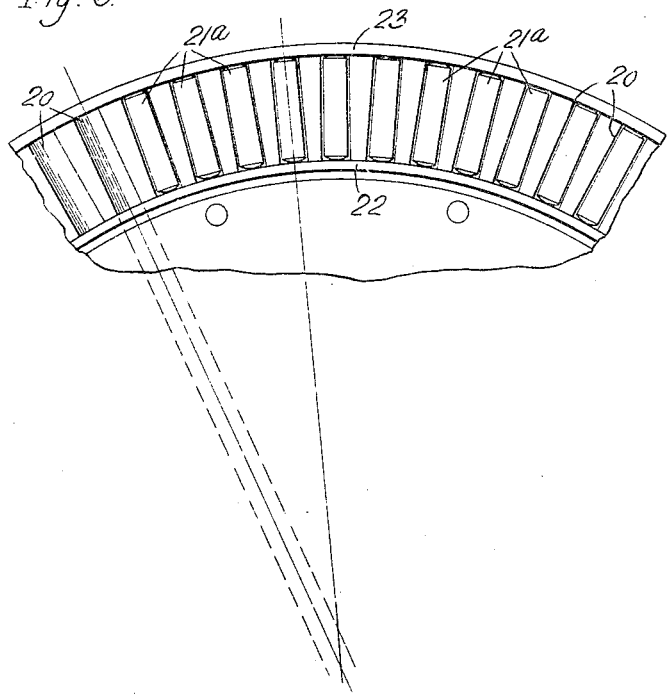
Fig. 6 is a fragmentary transverse sectional elevation thereof similar to Fig. 2, on a large scale.

The construction shown in Figs. 5 and 6 is substantially the same as above described except that the armatures 21ª are cylindrical instead of frusto-conical in shape. The cylindrical armatures are arranged on the armature carrier with their axes on radial lines, and as the edges of the magnet faces are also radial they are adapted to contact with the armatures on radial lines from end to end of the armatures. When the armature carrier is rotating the outward pressure of the convex ends of the armatures against the convex faces 23ª of the retaining ring 23, due to centrifugal force, tends to move the armatures into their pockets out of frictional contact with the magnetic faces of the driving and brake members.

The constructions described are simple and can be manufactured readily and at a small expense. The gaps or grooves 16 in the magnetic members 1 and 3 and the armature grooves 20 in the driven member, or armature carrier 2, can be cored and the adjacent faces of the rims of the driven and magnetic members can then be planed to give the proper clearance. The tapered armatures of uniform size can be manufactured or purchased from the manufacturers of taper pins and rollers at small expense. It is not necessary for the armatures to be nicely fitted in the grooves 12 in the armature carrier, it being only necessary to retain the armatures in their respective radial arrangement and to provide for the necessary freedom of movement of the armatures in their grooves to enable the armatures to move slightly into and out of frictional contact with the magnet faces of the driving and brake members. Since the armatures are round and free to turn in their pockets they can roll or turn when they strike the corners of the magnet faces, and they also have a rolling contact with the faces, and the same nicety of fit and adjustment is not required that would be necessary with non-circular armatures.

The electric coils of the driving and brake members can be connected with the source of electric current in any suitable way. In the case of the rotatable driving member, the terminals of the coil are connected with collector rings 26 and 27, suitably mounted on the hub of the driving member and insulated therefrom and from each other and adapted to run in contact with brushes (not shown) connected to the terminals of the electric circuit. In the case of the brake member, which does not rotate, it is not necessary to provide collector rings and the terminals of the coil for this member can be directly connected with the energizing electric circuit in any convenient way.

In the operation of the device, assuming that the driving member 1 is rotating, if the magnets thereof are energized by an exciting current in the coil 13, the armatures of the driven member 2 adjacent to the driving member will be drawn against the magnet portions 14 and 15, each armature contacting with two radially alined portions of opposite polarity and thereby completing a magnetic circuit through these portions and causing the driven member to turn with the driving member. As shown in the drawings the edges of each pair of the radially alined portions of the magnetic driving and brake members are disposed radially relatively to the axis of rotation, and the axes of the armatures being similarly disposed, each armature being of circular cross section, will contact with the magnet faces on a radial line. Consequently, the armatures, in leaving the magnet faces to cross the intervening gaps will assume the position shown in Fig. 3, in which the armatures are substantially parallel with the radial edges of the magnet faces. Greater force will be required to pull them from this position than would be the case if the armatures were arranged at an angle to the edges of the magnet faces, and all the magnetic circuits will have to be broken simultaneously. In this manner more torque can be exerted by the driving member than if the armatures bridged the gaps between the magnet portions and could slip from one pair of magnet poles to the next pair without breaking the magnetic circuit. Thus, much greater torque can be produced in a clutch of this construction with a current of given strength than in clutches in which the armatures bridge the spaces between adjacent magnetic portions, or in which the magnetic surface is not interrupted. The torque is increased in proportion to the multiplication of the coöperating armatures and magnet portions, so that by providing the clutch with a large number of closely arranged magnet portions and armatures, the slip or relative movement between the driving and driven member is reduced and the clutch will take hold promptly and be very positive and powerful in action. The friction between the armatures and the magnet faces is reduced to a minimum by this construction.

While a combined clutch and brake has been described and illustrated herein, it will be manifest that the construction described is equally applicable to either a clutch or a brake alone, and that the invention is independent of the particular manner of constructing, mounting and driving, or holding from rotation, the carrying members for the coöperating magnet portions and armatures, the invention relating more especially to the construction, arrangement and coöperation of these parts. Furthermore, while the armatures are mounted on the driven member 2, and the driving and stationary members 1 and 3, are the magnetic members in the construction shown, it would be a mere obvious reversal of this arrangement to mount the armatures on the driving and stationary members and provide the driven member with the coöperating magnet portions.

I claim as my invention:—

1. The combination of two members one of which is rotatable relative to the other, one of said members being magnetic and having a circular series of magnet portions separated by intervening open gaps, armatures carried by said other member and arranged in a corresponding circular series, said armatures being movable on said carrying member toward said magnet portions, and means on said magnetic member for preventing said armatures from entering said gaps.

2. The combination of two members one of which is rotatable relative to the other, one of said members being magnetic and having a circular series of magnet portions separated by intervening open gaps, armatures carried by said other member and arranged in a corresponding circular series, said armatures being movable on said carrying member toward said magnet portions, and rings on said magnetic member crossing said gaps for preventing said armatures from entering the gaps.

3. The combination of two members one of which is rotatable relative to the other, one of said members being magnetic and having a circular series of magnet portions separated by intervening open gaps, armatures carried by said other member and arranged in a corresponding circular series, said armatures consisting of magnetic pieces of frusto-conical shape loosely retained in pockets in said carrying member.

4. The combination of two members, one of which is rotatable relative to the other, one of said members being magnetic and having a circular series of magnet portions separated by intervening open gaps, armatures carried by said other member and arranged in a corresponding circular series, said armatures consisting of magnetic pieces of frusto-conical shape loosely retained in pockets in said carrying member with one side thereof substantially parallel with the plane of rotation of said carrying member.

5. The combination of two members arranged in close proximity to each other, one of which is rotatable relative to the other, one of said members being magnetic and having a series of spaced magnet portions, a series of spaced armatures of frusto-conical shape loosely mounted on said other member and arranged with one side thereof substantially parallel with said magnet portions, said armatures being movable into contact with said magnet portions and being movable into substantially parallel relationship to said magnet portions.

6. The combination of two members one of which is rotatable relative to the other, one of said members being magnetic and having a series of spaced radial magnet portions at one side thereof, a series of spaced armatures of frusto-conical shape carried by said other member and arranged radially thereon at the side thereof adjacent said magnet portions, said armatures being confined in pockets in the side of said carrying member with their larger ends outermost and being movable into substantially parallel relationship to said magnet portions.

7. The combination of two members one of which is rotatable relative to the other, one of said members being magnetic and having at one side thereof a series of radial magnet portions separated by intervening gaps, and said other member having a series of radial pockets in the side thereof adjacent the first member, and a series of radial frusto-conical armatures loosely confined in said pockets with their larger ends outermost and movable therein toward said magnet portions, said armatures being self alining to bring their axes parallel with the edges of said radial magnet portions when passing over said edges.

8. The combination of two members, one of which is rotatable relatively to the other, one of said members being magnetic and having a circular series of magnet portions radially arranged relatively to the axis of rotation of said members and separated by intervening open gaps, the line of separation between each of said magnet portions and said gaps being disposed radially to the axis of rotation of said members, armatures carried by said other member and arranged in a corresponding circular series with their axes disposed radially to the axis of rotation of said members, said armatures consisting of magnetic pieces of frusto-conical shape loosely retained in pockets in said carrying member and coöperating with said radially arranged magnetic portions on radial lines of contact.

9. The combination of two members one of which is rotatable relatively to the other, one of said members being magnetic and having a circular series of magnet portions radially arranged relatively to the axis of rotation of said members and separated by intervening open gaps, the line of separation between each of said magnet portions and said gaps being disposed radially to the axis of rotation of said members, armatures carried by said other member and arranged in a corresponding circular series with their axes disposed radially to the axis of rotation of said members, said armatures consisting of magnetic pieces of frusto-conical shape loosely retained in pockets in said carrying member with one side thereof substantially parallel with the plane of rotation of said carrying member, and coöperating with said radially arranged magnetic portions on radial lines of contact.

10. The combination of oppositely arranged driving and brake members, an armature carrier which is arranged between said driving and brake members and is rotatable relatively thereto, said driving and brake members having spaced magnet portions of opposite polarity, separated by intervening open gaps, said magnet portions being located in said driving and brake members at the sides thereof facing said armature carrier, and said armature carrier having pockets in the sides thereof facing said driving and brake members, armatures of circular cross section located in said pockets with their axes disposed radially to the axis of rotation of said members and said armature carrier, and said axes inclined outwardly away from the faces of said magnetic portions of said driving and brake members, so that the armatures on that side of said armature carrier which is opposite to the one which may have its armatures in magnetic engagement with either said brake or said clutch member, will remain out of contact with the other member, and said armatures being adapted to form a substantially frictionless magnetic engagement between either of said members and said armature carrier.

Witness my hand this 3rd day of July, 1916.

WILLIAM C. HUEBNER.

Witnesses:
C. W. PARKER,
A. L. McGEE.